US007855633B2

(12) United States Patent
Chuey

(10) Patent No.: US 7,855,633 B2
(45) Date of Patent: Dec. 21, 2010

(54) REMOTE CONTROL AUTOMATIC APPLIANCE ACTIVATION

(75) Inventor: Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 1156 days.

(21) Appl. No.: 11/507,767

(22) Filed: Aug. 22, 2006

(65) Prior Publication Data

US 2006/0279399 A1 Dec. 14, 2006

Related U.S. Application Data

(63) Continuation of application No. 10/630,315, filed on Jul. 30, 2003, now Pat. No. 7,161,466.

(51) Int. Cl.
*G05B 19/00* (2006.01)

(52) U.S. Cl. .................... 340/5.26; 340/5.22; 340/5.64; 340/5.71

(58) Field of Classification Search ................ 340/5.26, 340/5.22, 5.71, 825.22, 825.69, 5.64; 455/418, 455/419

See application file for complete search history.

(56) References Cited

U.S. PATENT DOCUMENTS

| | | | |
|---|---|---|---|
| 1,522,241 | A | 1/1925 | Hennessey |
| 3,098,212 | A | 7/1963 | Creamer, Jr. |
| 3,300,867 | A | 1/1967 | Sampson |
| 3,337,992 | A | 8/1967 | Tolson |
| 3,456,387 | A | 7/1969 | Tolson |
| 3,680,951 | A | 8/1972 | Jordan et al. |
| 4,074,200 | A | 2/1978 | Buchta |
| 4,167,833 | A | 9/1979 | Farina |
| 4,178,549 | A | 12/1979 | Ledenbach et al. |
| 4,219,812 | A | 8/1980 | Rittenbach |
| 4,241,870 | A | 12/1980 | Marcus |
| 4,247,850 | A | 1/1981 | Marcus |
| 4,425,717 | A | 1/1984 | Marcus |
| 4,447,808 | A | 5/1984 | Marcus |
| 4,453,161 | A | 6/1984 | Lemelson |
| 4,482,947 | A | 11/1984 | Zato et al. |
| 4,529,980 | A | 7/1985 | Liotine et al. |
| 4,535,333 | A | 8/1985 | Twardowski |
| 4,581,827 | A | 4/1986 | Higashi |
| 4,595,228 | A | 6/1986 | Chu |

(Continued)

FOREIGN PATENT DOCUMENTS

DE 42 04 463 A1 8/1992

(Continued)

OTHER PUBLICATIONS

Garage Door/Gate Remote Control User's Instructions (Model 39), Skylink Technologies Inc., 2002.

(Continued)

*Primary Examiner*—Edwin C Holloway, III
(74) *Attorney, Agent, or Firm*—Brooks Kushman P.C.

(57) ABSTRACT

A programmable remote control automatically learns characteristics necessary to generate an appliance activation signal. A sensor is positioned proximate to the appliance. A sequence of different activation signals is transmitted. A determination as to which signal activated the appliance is made based on a received sensor signal. Data representing the determined activation scheme is associated with an activation input.

9 Claims, 8 Drawing Sheets

U.S. PATENT DOCUMENTS 4,598,287 A 7/1986 Osakabe et al.
4,623,887 A 11/1986 Welles, II
4,631,708 A 12/1986 Wood et al.
4,635,033 A 1/1987 Inukai et al.
4,638,433 A 1/1987 Schindler
4,665,397 A 5/1987 Pinnow
4,676,601 A 6/1987 Itoh et al.
4,700,327 A 10/1987 Hilton
4,703,359 A 10/1987 Rumbolt et al.
4,706,299 A 11/1987 Jorgensen
4,707,788 A 11/1987 Tashiro et al.
RE32,576 E 1/1988 Pastore
4,727,302 A 2/1988 Mizuta et al.
4,743,905 A 5/1988 Wiegand
4,747,159 A 5/1988 Kato
4,750,118 A 6/1988 Heitschel et al.
4,754,255 A 6/1988 Sanders et al.
4,771,283 A 9/1988 Imoto
4,793,690 A 12/1988 Gahan et al.
4,799,189 A 1/1989 Grover
4,806,930 A 2/1989 Wojciak, Jr.
4,825,200 A 4/1989 Evans et al.
4,866,434 A 9/1989 Keenan
4,881,148 A 11/1989 Lambropoulos
4,882,565 A 11/1989 Gallmeyer
4,886,960 A 12/1989 Molyneux et al.
4,890,108 A 12/1989 Drori et al.
4,896,030 A 1/1990 Miyaji
4,905,279 A 2/1990 Mishio
4,912,463 A 3/1990 Li
4,917,477 A 4/1990 Bechtel et al.
4,953,305 A 9/1990 Van Lente et al.
4,959,810 A 9/1990 Darbee et al.
4,978,944 A 12/1990 Andros et al.
4,988,992 A 1/1991 Heitschel
5,016,996 A 5/1991 Ueno
5,064,274 A 11/1991 Alten
5,085,062 A 2/1992 Capdevila
5,103,221 A 4/1992 Memmola
5,109,222 A 4/1992 Welty
5,113,821 A 5/1992 Fukui et al.
5,122,647 A 6/1992 Lynam
5,123,008 A 6/1992 Beesley
5,126,686 A 6/1992 Tam
5,146,215 A 9/1992 Drori
5,154,617 A 10/1992 Suman et al.
5,181,423 A 1/1993 Philipps
5,191,610 A 3/1993 Hill et al.
5,193,210 A 3/1993 Nicholas et al.
5,201,067 A 4/1993 Grube et al.
5,225,847 A 7/1993 Roberts et al.
5,243,322 A 9/1993 Thompson
5,252,960 A 10/1993 Duhame
5,252,977 A 10/1993 Lueker
5,266,945 A 11/1993 Peek et al.
5,278,547 A 1/1994 Suman et al.
5,369,706 A 11/1994 Latka
5,379,453 A 1/1995 Tigwell
5,398,284 A 3/1995 Koopman, Jr. et al.
5,402,105 A 3/1995 Doyle et al.
5,408,698 A 4/1995 Serizawa
5,412,379 A 5/1995 Waraksa et al.
5,420,925 A 5/1995 Michaels
5,442,340 A 8/1995 Dykema
5,455,716 A 10/1995 Suman et al.
5,463,374 A 10/1995 Mendez
5,471,668 A 11/1995 Soenen et al.
5,473,317 A 12/1995 Inomata et al.
5,475,366 A 12/1995 Van Lente et al.
5,479,155 A 12/1995 Zeinstra et al.
5,481,256 A 1/1996 Darbee et al.
5,510,791 A 4/1996 Viertel et al.
5,517,187 A 5/1996 Bruwer et al.
5,528,230 A 6/1996 Kim
5,554,977 A 9/1996 Jablonski et al.
RE35,364 E 10/1996 Heitschel et al.
5,564,101 A 10/1996 Eisfeld et al.
5,583,485 A 12/1996 Van Lente et al.
5,594,429 A 1/1997 Nakahara
5,596,316 A 1/1997 Honeck
5,598,475 A 1/1997 Soenen
5,613,732 A 3/1997 Demick
5,614,885 A 3/1997 Van Lente
5,614,891 A 3/1997 Zeinstra
5,614,906 A 3/1997 Hayes et al.
5,619,190 A 4/1997 Duckworth
5,627,529 A 5/1997 Duckworth
5,645,308 A 7/1997 Fink
5,646,701 A 7/1997 Duckworth
5,661,455 A 8/1997 Van Lente
5,661,651 A 8/1997 Geschke et al.
5,661,804 A 8/1997 Dykema et al.
5,680,131 A 10/1997 Utz
5,680,134 A 10/1997 Tsui
5,686,903 A 11/1997 Duckworth
5,686,904 A 11/1997 Bruwer
5,691,848 A 11/1997 Van Lente
5,699,044 A 12/1997 Van Lente
5,699,054 A 12/1997 Duckworth
5,699,055 A 12/1997 Dykema et al.
5,708,415 A 1/1998 Van Lente
5,715,020 A 2/1998 Kuroiwa et al.
5,726,645 A 3/1998 Kamon et al.
5,731,756 A 3/1998 Roddy
5,751,224 A 5/1998 Fitzgibbon
5,758,300 A 5/1998 Abe
5,774,064 A 6/1998 Lambropoulos et al.
5,790,948 A 8/1998 Eisfeld et al.
5,793,300 A 8/1998 Suman et al.
5,810,420 A 9/1998 Welling
5,812,097 A 9/1998 Maldonado
5,831,548 A 11/1998 Fitzgibbon
5,838,255 A 11/1998 Di Croce
5,841,253 A 11/1998 Fitzgibbon
5,841,390 A 11/1998 Tsui
5,841,813 A 11/1998 Van Nee
5,844,473 A 12/1998 Kaman
5,845,593 A 12/1998 Birkestrand
5,854,593 A 12/1998 Dykema
5,872,513 A 2/1999 Fitzgibbon
5,903,226 A 5/1999 Suman et al.
5,910,784 A 6/1999 Lai
5,926,087 A 7/1999 Busch et al.
5,926,106 A 7/1999 Beran et al.
5,940,000 A 8/1999 Dykema
5,940,007 A 8/1999 Brinkmeyer
5,940,120 A 8/1999 Frankhouse et al.
5,949,349 A 9/1999 Farris et al.
5,990,828 A 11/1999 King
5,995,898 A 11/1999 Tuttle
6,002,332 A 12/1999 King
6,005,508 A 12/1999 Tsui
6,008,735 A 12/1999 Chiloyan et al.
6,009,355 A 12/1999 Obradovich et al.
6,020,829 A 2/2000 Hormann
6,021,319 A 2/2000 Tigwell
6,023,241 A 2/2000 Clapper
6,025,785 A 2/2000 Farris et al.
6,031,465 A 2/2000 Burgess
6,043,753 A 3/2000 Okayasu et al.
6,049,289 A 4/2000 Waggamon et al.
6,055,468 A 4/2000 Kaman et al.
6,055,508 A 4/2000 Naor et al.
RE36,703 E 5/2000 Heitschel et al.

| | | | |
|---|---|---|---|
| 6,072,404 | A | 6/2000 | Nolan et al. |
| 6,072,436 | A | 6/2000 | Marougi |
| 6,078,271 | A | 6/2000 | Roddy |
| 6,081,203 | A | 6/2000 | Fitzgibbon |
| 6,091,330 | A | 7/2000 | Swan et al. |
| 6,091,343 | A | 7/2000 | Dykema et al. |
| 6,097,309 | A | 8/2000 | Hayes et al. |
| 6,104,101 | A | 8/2000 | Miller et al. |
| 6,127,740 | A | 10/2000 | Roddy |
| 6,127,922 | A | 10/2000 | Roddy et al. |
| 6,127,961 | A | 10/2000 | Stacy et al. |
| 6,130,625 | A | 10/2000 | Harvey |
| 6,131,019 | A | 10/2000 | King |
| 6,137,421 | A | 10/2000 | Dykema |
| 6,144,114 | A | 11/2000 | Chutorash |
| 6,154,148 | A | 11/2000 | Fluharty et al. |
| 6,154,544 | A | 11/2000 | Farris et al. |
| 6,157,319 | A | 12/2000 | Johns et al. |
| 6,160,319 | A | 12/2000 | Marougi et al. |
| 6,166,650 | A | 12/2000 | Bruwer |
| 6,175,312 | B1 | 1/2001 | Bruwer et al. |
| 6,181,255 | B1 | 1/2001 | Crimmins |
| 6,188,889 | B1 | 2/2001 | Tsai |
| 6,191,701 | B1 | 2/2001 | Bruwer |
| 6,236,350 | B1 | 5/2001 | Andrews |
| 6,243,000 | B1 | 6/2001 | Tsui |
| 6,249,673 | B1 | 6/2001 | Tsui |
| 6,265,987 | B1 | 7/2001 | Wang et al. |
| 6,271,765 | B1 | 8/2001 | King |
| 6,275,379 | B1 | 8/2001 | Quinno et al. |
| 6,282,152 | B1 | 8/2001 | Kurple |
| 6,292,230 | B1 | 9/2001 | Shui et al. |
| 6,308,083 | B2 | 10/2001 | King |
| 6,320,514 | B1 | 11/2001 | Flick |
| 6,333,698 | B1 | 12/2001 | Roddy |
| 6,344,817 | B1 | 2/2002 | Verzulli |
| 6,359,558 | B1 | 3/2002 | Tsui |
| 6,362,771 | B1 | 3/2002 | Schofield et al. |
| 6,377,173 | B1 | 4/2002 | Desai |
| 6,396,408 | B2 | 5/2002 | Drummond |
| 6,397,058 | B1 | 5/2002 | Thibert et al. |
| 6,414,587 | B1 | 7/2002 | Fitzgibbon |
| 6,426,706 | B1 | 7/2002 | King |
| 6,441,719 | B1 | 8/2002 | Tsui |
| 6,472,885 | B1 | 10/2002 | Green et al. |
| 6,486,795 | B1 | 11/2002 | Sobel et al. |
| 6,512,461 | B1 | 1/2003 | Benzie et al. |
| RE37,986 | E | 2/2003 | Heitschel et al. |
| 6,525,645 | B2 | 2/2003 | King |
| 6,529,556 | B1 | 3/2003 | Perdue et al. |
| 6,542,076 | B1 | 4/2003 | Joao |
| 6,556,681 | B2 | 4/2003 | King |
| 6,556,813 | B2 | 4/2003 | Tsui |
| 6,559,775 | B1 | 5/2003 | King |
| 6,590,505 | B1 | 7/2003 | Matsui et al. |
| 6,597,291 | B2 | 7/2003 | Tsui |
| 6,597,374 | B1 | 7/2003 | Baker et al. |
| 6,634,408 | B2 | 10/2003 | Mays |
| 6,661,350 | B1 | 12/2003 | Rohrberg et al. |
| 6,690,796 | B1 | 2/2004 | Farris et al. |
| 6,703,941 | B1 | 3/2004 | Blaker |
| 6,724,339 | B2 | 4/2004 | Conway et al. |
| 6,747,568 | B1 | 6/2004 | Teskey |
| 6,759,943 | B2 | 7/2004 | Lucy et al. |
| 6,774,813 | B2 | 8/2004 | van Ee et al. |
| 6,791,467 | B1 | 9/2004 | Ben-Ze'ev |
| 6,810,123 | B2 | 10/2004 | Farris et al. |
| 6,822,603 | B1 | 11/2004 | Crimmins et al. |
| 6,903,650 | B2 | 6/2005 | Murray |
| 6,956,460 | B2 | 10/2005 | Tsui |
| 6,963,267 | B2 | 11/2005 | Murray |
| 6,975,203 | B2 | 12/2005 | Brookbank et al. |
| 2001/0007086 | A1 | 7/2001 | Rogers et al. |
| 2002/0034303 | A1 | 3/2002 | Farris et al. |
| 2002/0067826 | A1 | 6/2002 | King |
| 2002/0075133 | A1 | 6/2002 | Flick |
| 2002/0126037 | A1 | 9/2002 | Fitzgibbon |
| 2002/0137479 | A1 | 9/2002 | Tsui |
| 2002/0140569 | A1 | 10/2002 | Van Ee et al. |
| 2002/0163440 | A1 | 11/2002 | Tsui |
| 2002/0190872 | A1 | 12/2002 | Suman |
| 2002/0191794 | A1 | 12/2002 | Farris |
| 2002/0197955 | A1 | 12/2002 | Witkowski |
| 2003/0016119 | A1 | 1/2003 | Teich |
| 2003/0016139 | A1 | 1/2003 | Teich |
| 2003/0033540 | A1 | 2/2003 | Fitzgibbon |
| 2003/0067394 | A1 | 4/2003 | Tsui |
| 2003/0076235 | A1 | 4/2003 | Tsui |
| 2003/0085798 | A1 | 5/2003 | Castro Esteban |
| 2003/0112121 | A1 | 6/2003 | Wilson |
| 2003/0118187 | A1 | 6/2003 | Fitzgibbon |
| 2003/0153306 | A1 | 8/2003 | Study et al. |
| 2003/0189530 | A1 | 10/2003 | Tsui |
| 2003/0197594 | A1 | 10/2003 | Olson |
| 2003/0197595 | A1 | 10/2003 | Olson |
| 2003/0216139 | A1 | 11/2003 | Olson |
| 2003/0228879 | A1 | 12/2003 | Witkowski |
| 2004/0017292 | A1 | 1/2004 | Reese et al. |
| 2004/0048622 | A1 | 3/2004 | Witkowski et al. |
| 2004/0061591 | A1 | 4/2004 | Teich |
| 2004/0066936 | A1 | 4/2004 | Farris et al. |
| 2004/0100391 | A1 | 5/2004 | Guthrie |
| 2004/0110472 | A1 | 6/2004 | Witkowski et al. |
| 2004/0207537 | A1 | 10/2004 | Keller, Jr. et al. |
| 2004/0243813 | A1 | 12/2004 | Farris et al. |
| 2005/0024184 | A1 | 2/2005 | Chuey |
| 2005/0024185 | A1 | 2/2005 | Chuey |
| 2005/0024229 | A1 | 2/2005 | Chuey |
| 2005/0024230 | A1 | 2/2005 | Chuey |
| 2005/0024254 | A1 | 2/2005 | Chuey |
| 2005/0024255 | A1 | 2/2005 | Chuey |
| 2005/0026601 | A1 | 2/2005 | Chuey |
| 2005/0026602 | A1 | 2/2005 | Chuey |
| 2005/0026605 | A1 | 2/2005 | Guthrie |
| 2005/0046545 | A1 | 3/2005 | Skekloff et al. |
| 2006/0181428 | A1 | 8/2006 | Blaker et al. |
| 2006/0217850 | A1 | 9/2006 | Geerlings et al. |
| 2006/0232376 | A1 | 10/2006 | Blaker |
| 2006/0234670 | A1 | 10/2006 | Blaker et al. |

FOREIGN PATENT DOCUMENTS

| | | | |
|---|---|---|---|
| EP | 0 372 285 | A1 | 6/1990 |
| EP | 0 670 402 | A1 | 9/1995 |
| EP | 1 052 608 | A1 | 11/2000 |
| EP | 1 129 441 | B1 | 9/2001 |
| FR | 2 792 444 | | 10/2000 |
| GB | 2171545 | A | 8/1986 |
| GB | 2 182 790 | A | 10/1986 |
| GB | 2 265 482 | A | 9/1993 |
| GB | 2 302 751 | A | 6/1996 |
| GB | 2 325 552 | | 11/1998 |
| GB | 2 336 433 | | 4/1999 |
| GB | 2335773 | A | 9/1999 |
| GB | 2 366 433 | A1 | 5/2000 |
| KR | 2002078726 | | 10/2002 |
| WO | WO 94/02920 | | 2/1994 |
| WO | WO 94/18036 | A1 | 8/1994 |
| WO | WO 99/63308 | A | 9/1999 |
| WO | WO 99/64274 | A1 | 12/1999 |
| WO | WO 00/12850 | A1 | 3/2000 |
| WO | WO 00/29699 | | 5/2000 |
| WO | WO 00/70577 | | 11/2000 |
| WO | WO 02/080129 | A2 | 10/2002 |
| WO | WO 2004/034352 | | 4/2004 |
| WO | WO 2004/036526 | | 4/2004 |

| | | | |
|---|---|---|---|
| WO | WO 2004/043750 A2 | 5/2004 |
| WO | WO 2004/066514 | 8/2004 |
| WO | WO 2004/077729 A2 | 9/2004 |
| WO | WO 2004/104966 A2 | 12/2004 |
| WO | WO 2004/104966 A3 | 12/2004 |
| WO | WO 2005/002080 | 1/2005 |

OTHER PUBLICATIONS

HomeLink Wireless Control System Lighting Kit Installation, http://www.homelink.com/print/lighting_print.html.
HomeLink Wireless Control System Frequently Asked Questions, http://www.homelink.com/print/faq_print.html.
HomeLink Universal 2 Channel Receiver Model PR433-2, Installation Instructions, 114A2437, 2000.
Getting Started with HomeLink, Programming Garage Door Openers and Gates.
HomeLink Universal Transceiver Lighting Package Programming.
Microchip HCS360 Keeloq Code Hopping Encoder, Microchip Technology Inc., DS40152E, 2002.
Microchip TB003, An Introduction to Keeloq Code Hopping, Microchip Technology Inc., DS91002A, 1996.
Chamberlain LiftMaster Professional Universal Receiver Model 635LM Owner's Manual, 114A2128C, The Chamberlain Group, Inc., 2002.
Flash2Pass eliminates past garage door opener hassles using a secure and easy-to-install system, Press Release, F2P Electronics, Inc., Jan. 2002.
Flash2Pass Easy Set Up Instructions, v031003, F2P Technologies.
The X-10 Powerhouse Power Line Interface Model #PL513 and Two-Way Power Line Interface Model #TW523, Technical Note, Dave Rye, Rev. 2.4, PL/TWTN/1291.
Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.
DRFM Theory of Operation, KOR Electronics, Inc., http://www.korelectronics.com/product_sheets/theory-of-operations/drfm-theoryofop.htm.
Fabrication Process Combines Low Cost and High Reliability, Murat Eron, Richard J. Perko and R. James Gibson, Microwaves & RF, Oct. 1993.
Pager and Garage Door Opener Combination, Gail Marino, Motorola Technical Developments, vol. 10, Mar. 1990.
Search and Examination Report Under Sections 17 and 18(3), mailed Sep. 25, 2003 for the corresponding European patent application GB 0308919.0.
Combined Search and Examination Report Under 37 Sections 17 and 18(3) mailed Nov. 30, 2004 for the corresponding European patent application GB 0415908.3.
Combined Search and Examination Report Under Sections 17 and 18(3) mailed Nov. 2, 2004 for European patent application GB 0416753.2.
Combined Search and Examination Report Under Sections 17 and 18(3) mailed Nov. 2, 2004 for European patent application GB 0416789.6.
Combined Search and Examination Report Under Sections 17 and 18(3) for European Application No. GB 0416742.5 dated Oct. 26, 2004.
German Search/Examination Document, German Patent Application No. 103 14 228.2, Dec. 14, 2004.
Marantec America Accessories Listing, Sep. 30, 2002, 3 pages.
Marantec America Products Listing, Sep. 30, 2002, 3 pages.
Marantec America Openers With a Difference Listing, Sep. 30, 2002, 2 pages.
"Marantec Expands Its Line of Radio Controls by Introducing the HomeLink compatible 315MHz Modular Frequency System," Marantec America News, Sep. 30, 2002, 3 pages.
Photo Modules for PCM Remote Control Systems, Vishay, TSPO22, Document No. 82095, Rev. 4, Mar. 30, 2001, 7 pages.
IP Receiver for High Data Rate PCM at 455 kHz, Vishay TSPO7000, Document No. 82147, Rev. 4, Mar. 29, 2001, 7 pages.

REMOTE CONTROL AUTOMATIC APPLIANCE ACTIVATION

CROSS-REFERENCE TO RELATED APPLICATIONS

This application is a continuation of U.S. application Ser. No. 10/630,315, filed Jul. 30, 2003, now U.S. Pat. No. 7,161, 466, which is hereby incorporated by reference in its entirety.

BACKGROUND OF THE INVENTION

1. Field of the Invention

The present invention relates to wireless remote control of appliances such as, for example, garage door openers.

2. Background Art

Home appliances, such as garage door openers, security gates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment remote control. Such functionality includes decreased size, multiple appliance interoperability, increased performance, and the like. Aftermarket controllers are also purchased to replace lost or damaged controllers or to simply provide another remote control for accessing the appliance.

An example application for aftermarket remote controls are remote garage door openers integrated into an automotive vehicle. These integrated remote controls provide customer convenience, appliance interoperability, increased safety, and enhanced vehicle value. Present in-vehicle integrated remote controls provide a "universal" or programmable garage door opener which learns characteristics of an existing transmitter by receiving an activation signal from the transmitter. Then, when prompted by a user, the programmable garage door opener generates an activation signal having the same characteristics. One problem with such devices is the difficulty experienced by users attempting to program the garage door opener. Another problem occurs if the user has lost all existing transmitters.

What is needed is a universal remote controller that is easier to program. This remote controller should be easily integrated into an automotive vehicle using simple electronic circuits.

SUMMARY OF THE INVENTION

The present invention provides a universal remote control that automatically learns characteristics necessary to generate an appliance activation signal.

A method for remotely activating an appliance is provided. The appliance activates upon receiving an activation signal based on one of a plurality of radio frequency (RF) fixed code and rolling code activation schemes. The method includes positioning a sensor proximate to the appliance, whereby the sensor can detect appliance activation. A sequence of different activation signals is transmitted from a remote control to the appliance. Each activation signal in the sequence is based on a respective one of the RF fixed code and rolling code activation schemes. A sensor signal indicating appliance activation is transmitted from the sensor to the remote control in response to the appliance detecting appliance activation. The remote control determines, based on the sensor signal, which of the plurality of RF fixed code and rolling code activation schemes resulted in the remote control transmitting an activation signal in the sequence that activated the appliance. Data representing the determined activation scheme is associated with an activation input of the remote control.

When transmitting the sequence of activation signals, the remote control may transmit the activation signals based on the RF rolling code activation schemes before transmitting the activation signals based on the RF fixed code activation schemes.

When transmitting the sequence of activation signals, the remote control may transmit, for each of the plurality of RF fixed code activation schemes, activation signals having different fixed code values.

The sensor may be remote from the remote control and, in this case, the sensor signal may be a RF sensor signal. Positioning the sensor proximate to the appliance may include positioning a motor vehicle.

The sensor may detect appliance activation by one or more of a variety of parameters including sensing motion of a mechanical barrier, sensing position of a mechanical barrier, sensing light emitted by the appliance, sensing vibration emitted by the appliance, sensing current drawn by the appliance, and the like.

A system for remotely activating an appliance is provided. The appliance activates upon receiving an activation signal based on one of a plurality of RF fixed code and rolling code activation schemes. The system includes a sensor operative to detect appliance activation and to transmit a sensor signal indicating appliance activation. The system further includes a remote control having a transmitter, memory, and control logic in communication with the sensor, the transmitter, and the memory. The control logic controls the transmitter to transmit a sequence of different activation signals each based on a respective one of the plurality of RF fixed code and rolling code activation schemes. The control logic receives the sensor signal from the sensor and uses the sensor signal to determine which of the plurality of RF fixed code and rolling code activation schemes resulted in the transmitter transmitting an activation signal in the sequence of activation signals that activated the appliance. The control logic stores data into the memory indicating the determined activation scheme.

A programmable appliance remote control is provided. The remote control includes a sensor, a controller, a transmitter, and a user interface. The sensor is operative to detect appliance activation and to generate a sensor signal indicating appliance activation. The appliance activates upon receiving an activation signal based on one of a plurality of RF fixed code and rolling code activation schemes. The controller is operative in a learn mode and an operate mode. In the learn mode, the controller generates transmitter control signals for transmitting each of a sequence of different activation signals respectively based on one of a plurality of RF rolling code activation schemes, the controller receives the sensor signal from the sensor and uses the sensor signal to determine which of the plurality of RF fixed code and rolling code activation schemes resulted in the activation signal activating the appliance, and the controller stores data representative of the determined activation scheme. In the operate mode, the controller generates transmitter control signals based on the stored data in response to receiving an activation input signal. The transmitter transmits activation signals based on the transmitter control signals. The user interface generates the activation input signal in response to user input.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
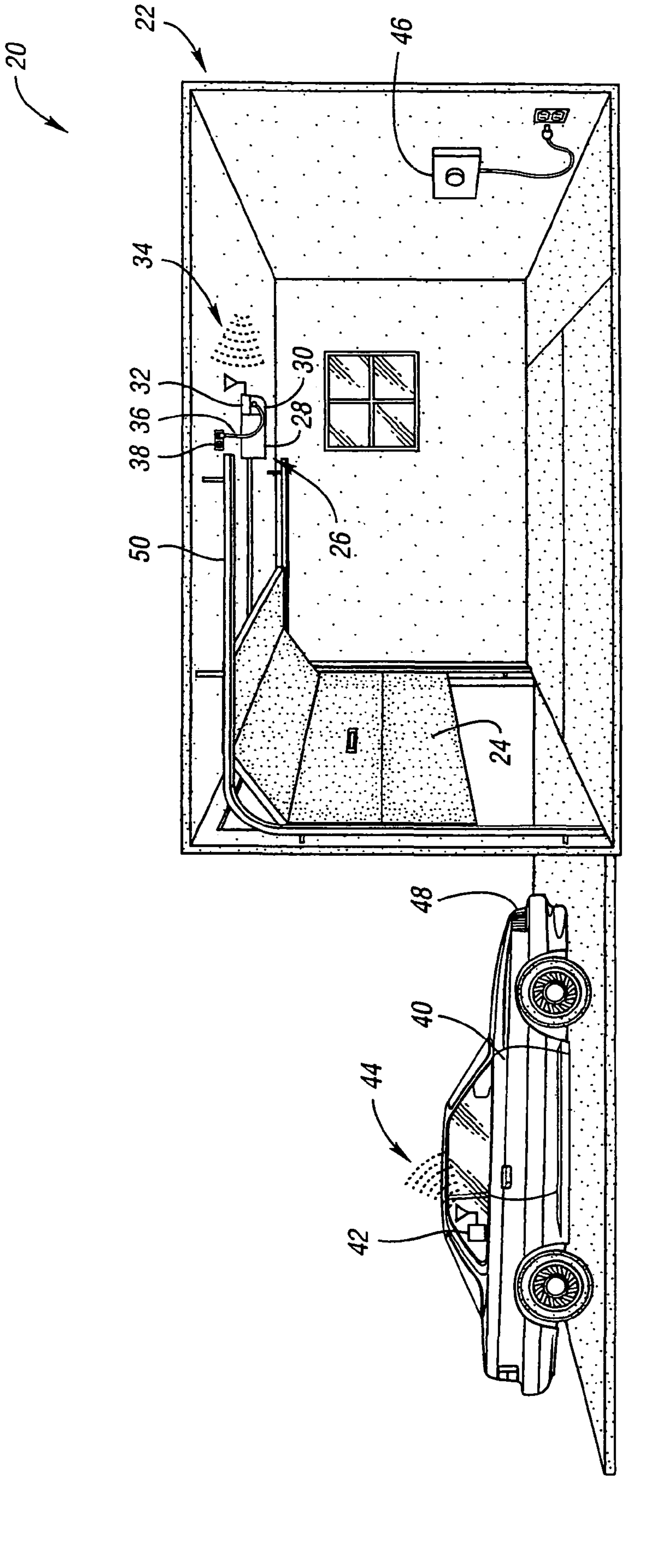
FIG. 1 is a schematic diagram illustrating appliance control according to an embodiment of the present invention.

Referring now to FIG. 1, a remotely controlled system, shown generally by 20, controls access to a garage, shown generally by 22. Garage 22 includes garage door 24 which can be opened and closed by garage door opener 26. Garage door opener 26 includes drive 28 for moving garage door 24, lamp 30 which turns on when garage door opener 26 is activated, and receiver 32 receiving radio frequency activation signal 34 for activating garage door opener 26. Garage door opener 26 receives electrical power through power cable 36 plugged into outlet 38 on the ceiling of garage 22.

Vehicle 40 includes programmable remote control 42 which generates a sequence of activation signals, shown generally by 44. Each activation signal in sequence of activation signals 44 has characteristics defined by one of a plurality of possible activation schemes. One of these schemes corresponds with activation signal 34 operating garage door opener 26. Selecting the proper activation signal 34 from sequence of activation signals 44 is based on sensing activation of garage door opener 26. A wide variety of sensing techniques are possible.

Remote sensor 46 may be placed within garage 22 to detect activation of garage door opener 26. For example, remote sensor 46 may respond to light from garage door opener lamp 30. Remote sensor 46 may also respond to vibration, including sound, produced by garage door opener 26 when drive 28 is in operation. Remote sensor 46 may also be magnetically or mechanically attached to garage door 24 for detecting motion and/or position of garage door 24. This may be accomplished, for example, by including in remote sensor 46 an accelerometer, inclinometer, or the like. Remote sensor 46 may also be mechanically or magnetically affixed to rail 50 upon which travels garage door 24. Remote sensor 46 may then include a velocimeter, accelerometer, microphone, or other vibration sensing transducer.

Remote sensor 46 may also operate together with appropriately positioned vehicle 40 for detecting activation of garage door opener 26. For example, a light sensitive transducer in remote sensor 46 may be positioned facing garage door 24. Vehicle 40 is then positioned on the opposite side of garage door 24 with headlamps 48 turned on. Closing garage door 24 interrupts light from headlamps 48 from otherwise striking remote sensor 46. The change in light level detected by remote sensor 46 indicates the activation of garage door opener 26.

Remote sensor 46 transmits the activation state of garage door opener 26, or a change in the activation state, to programmable remote control 42. Programmable remote control 42 uses the signal received from remote sensor 46 to determine which activation signal in sequence of activation signals 44 corresponds to activation signal 34 operating garage door opener 26. Information defining activation signal 34 is stored in association with a control input for programmable controller 42.

As an alternative to, or in addition with, remote sensor 46, system 20 may use a sensor mounted on vehicle 40. This may be a sensor placed in vehicle 40 specifically for the purpose of detecting activation of garage door opener 26. However, system 20 may also utilize a sensor placed on vehicle 40 for another purpose. One example of such a sensor is a light sensor for controlling the operation of headlamps 48. Automatic headlamp systems switch between high beam and low beam or between low beam and daylight operation based on a detected ambient light level. If this light sensor is mounted near the front of vehicle 40, and vehicle 40 is parked near door 24, the presence or absence of light from headlamps 48 reflected from door 24 may be used to indicate whether door 24 is open or closed.

Another in-vehicle sensing mechanism that may be used for detecting appliance activation is associated with a collision avoidance system. Radar or ultrasound signals are transmitted from the front and/or rear of vehicle 48. Proximity of objects is detected when the transmitted signals reflect off the object and return to vehicle 40. Once again, by parking vehicle 40 near door 24, collision avoidance detection signals may be used to detect whether garage door 24 is opened or closed.

Vehicle 40 may also include one or more light sensors capable of distinguishing whether garage door opener lamp 30 is on or off. These light sensors are used in a variety of options including control of headlamps 48, automatic wiper control, automatic defrost or defog control, and the like. Parking vehicle 40 within garage 22 allows one or more of these light sensors to determine when garage door opener 26 is activated.

Still another in-vehicle sensor that may be used to implement system 20 is a microphone mounted within the passenger compartment of vehicle 40. Microphones are increasingly used for on-board telematics and voice-controlled options. Lowering a window or opening a door on vehicle 40 would allow these microphones to detect sound vibrations generated by garage door opener drive 28 when garage door opener 26 is activated.

The present invention has been generally described with regard to a garage door opener. However, the present invention may be applied to controlling a wide variety of appliances such as other mechanical barriers, lighting systems, alarm systems, temperature control systems, and the like. Further, the remote control has been described as an in-vehicle remote control. The present invention also applies to remote controls that may be hand held, wall mounted, included in a key fob, and the like.

Figure 2:
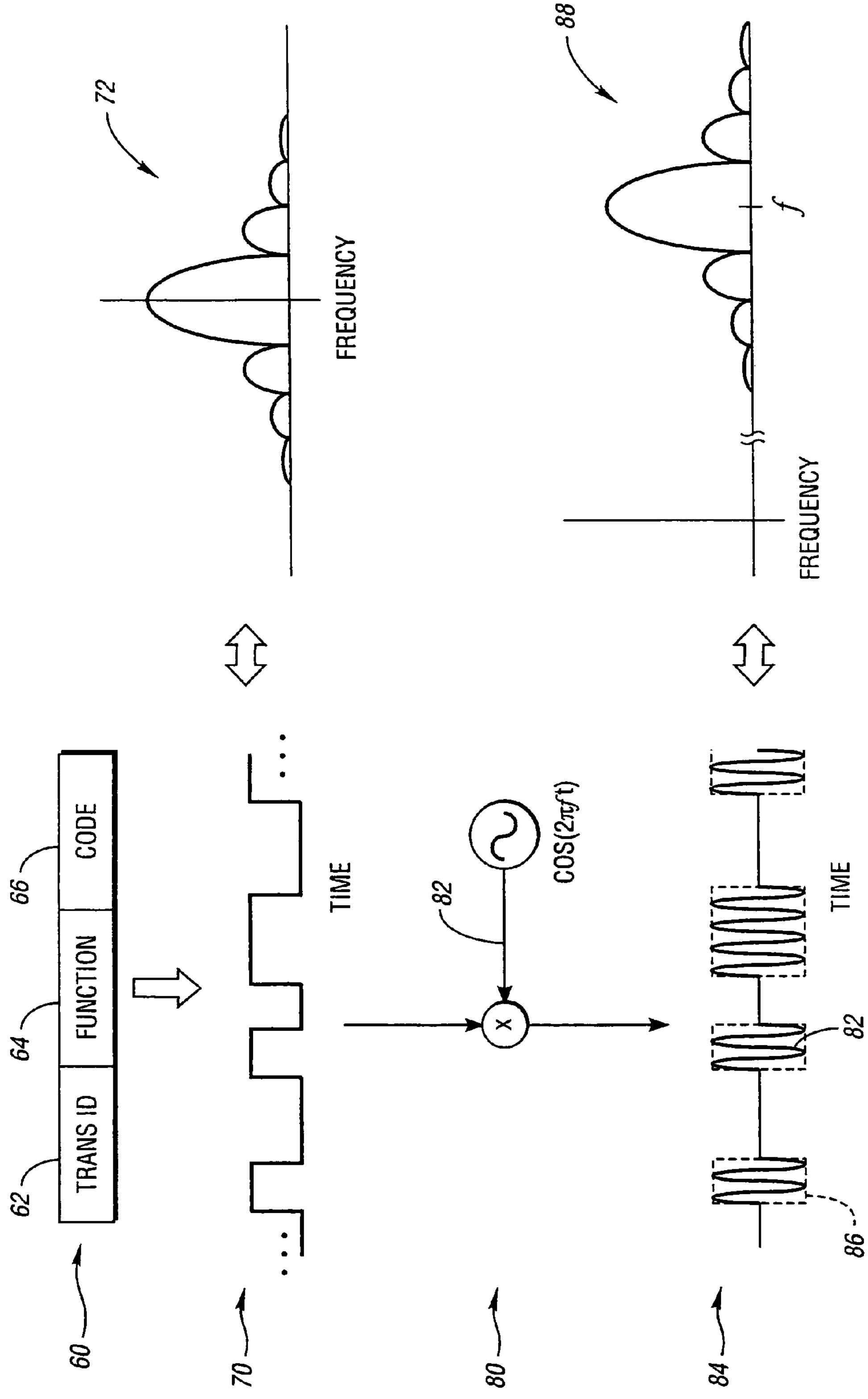
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level. Various baseband encoding or modulation schemes are possible, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 to be centered around the carrier frequency, $f$, of carrier 82.

Figure 3:
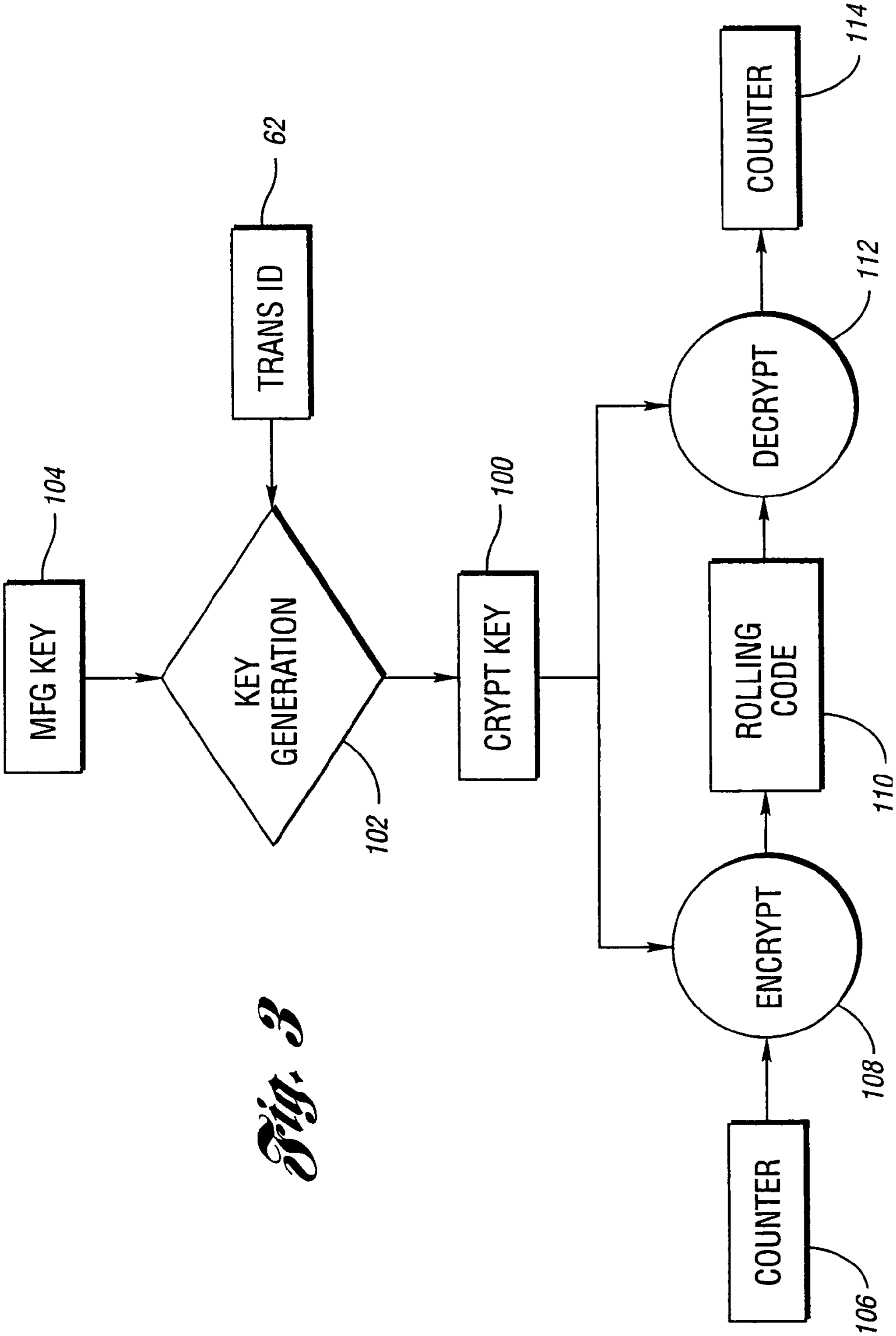
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. In a well-designed rolling code scheme, crypt key 100 is never transmitted from the transmitter to the receiver. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code 110 from counter 106 using crypt key 100. The transmitted activation signal includes rolling code 110 and transmitter identifier 62.

A rolling code receiver is trained to a compatible transmitter prior to operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the seed entered, for example, by pushing a particular combination of buttons. The receiver uses the "seed" to generate crypt key 100. As will be recognized by one of ordinary skill in the art, the present invention applies to the use of a "seed" for generating a crypt key as well as to any other variable code scheme.

Figure 4:
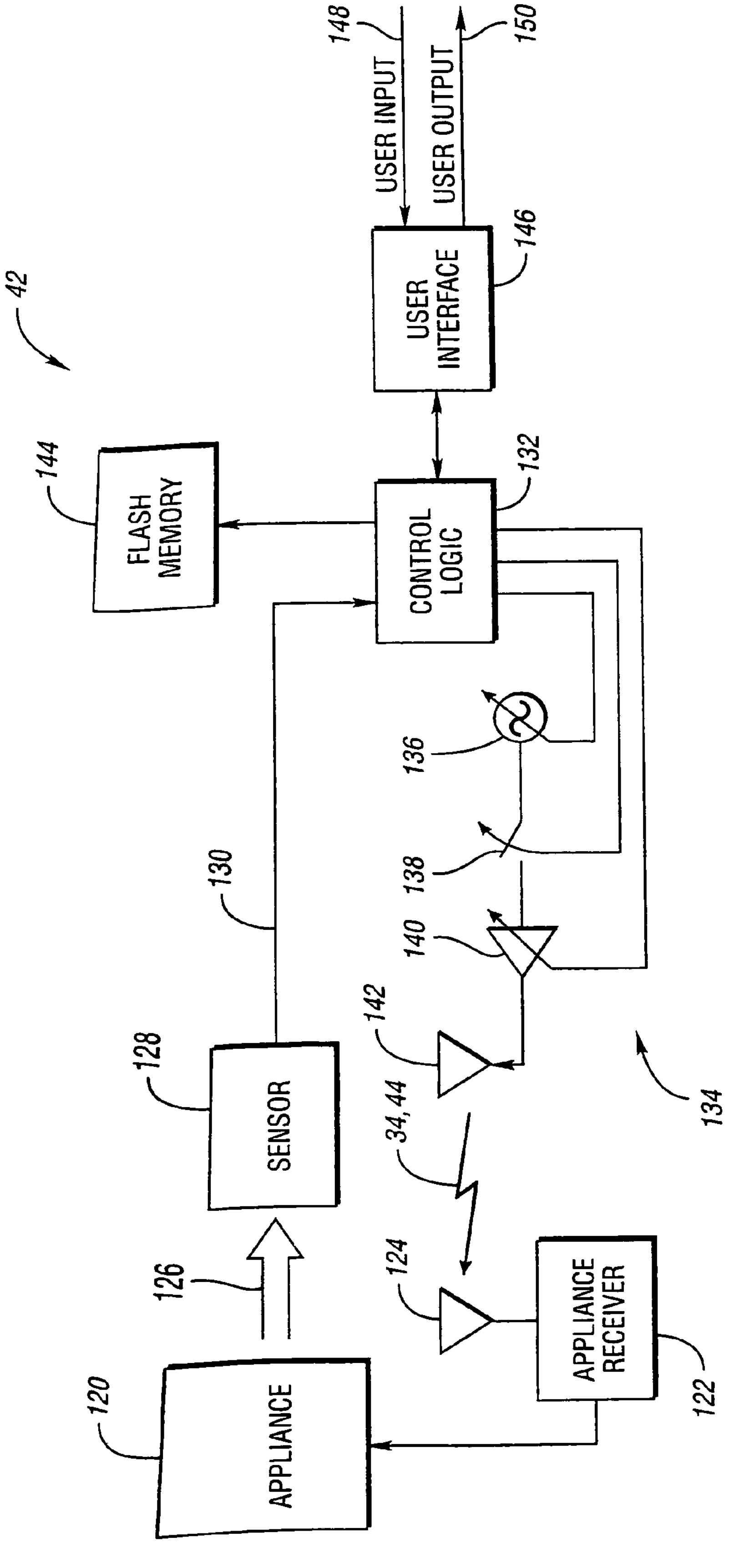
FIG. 4 is a block diagram illustrating an automatically programmed remote control according to an embodiment of the present invention.

Referring now to FIG. 4, a block diagram illustrating an automatically programmed remote control according to an embodiment of the present invention is shown. Appliance 120, such as garage door opener 26, is controlled by appliance receiver 122 based on receiving activation signal 34 through receiver antenna 124. Under the control of appliance receiver 122, appliance 120 modifies at least one parameter 126. Parameter 126 includes mechanical motion, mechanical position, light, temperature, sound, fluid level, humidity, voltage, current, power, resistance, inductance, capacitance, and the like.

Programmable remote control 42 includes sensor 128 for detecting one or more parameters 126 when sensor 128 is positioned proximate to appliance 120. Sensor 128 generates sensor signal 130 sent to control logic 132. Sensor signal 130 may represent a continuous variable or may be a binary variable indicating parameter 126 has crossed some threshold value. Sensor 128 may be hard wired to control logic 132. Sensor signal 130 may also travel along a bus interconnecting sensor 128 and control logic 132. Sensor signal 130 may also be transmitted using a radio link established between sensor 128 and control logic 132.

Programmable remote control 42 includes transmitter 134. An exemplary transmitter 134 includes variable oscillator 136, modulator 138, variable gain amplifier 140 and transmitter antenna 142. Transmitter 134 generates each activation signal in sequence of activation signals 44 by setting variable oscillator 136 to the carrier frequency. Modulator 138, represented here as a switch, modulates the carrier produced by variable oscillator 136 in response to data supplied by control logic 132. Variable gain amplifier 140 amplifies the modulated carrier to produce an activation signal transmitted from antenna 142.

When operating in a learn mode, control logic 132 generates sequence of activation signals 44 containing activation signal 34 implementing an activation scheme recognized by appliance receiver 122. In response to at least one sensor signal 130, control logic 132 determines which activation signal 34 activated appliance 120. Control logic 132 stores data representing activation signal 34 associated with a particular user input channel. In operate mode, when control logic 132 receives a user activation input for this channel, control logic 132 retrieves the stored data and generates activation signal 34.

Programmable remote control 42 includes non-volatile memory, such as flash memory 144, that can be written to and read from by control logic 132. Flash memory 144 holds information used by control logic 132 for generating sequence of activation signals 44. Flash memory 144 also stores data indicating which activation signal 34 was successfully automatically programmed to activate appliance 120.

Programmable remote control 42 includes user interface 146 in communication with control logic 132. User interface 146 receives user input 148 and generates user output 150. For simple systems, user input 148 is typically provided by up to three pushbuttons. User output 150 may be provided by illuminating one or more display lamps. User input 148 and user output 150 may also be provided through a wide variety of control and display devices such as touch activated display screens, speech generators, tone generators, voice recognition systems, telematic systems, and the like.

Control logic 132 is preferably implemented with a microcontroller executing code held in a non-volatile memory such as flash memory 144. Control logic 132 may also be implemented using any combination of analog or digital discreet components, programmable logic, computers, and the like. In addition, elements of control logic 132, transmitter 134, flash memory 144 and/or user interface 146 may be implemented on a single integrated circuit chip for decreased cost in mass production.

Figure 5:
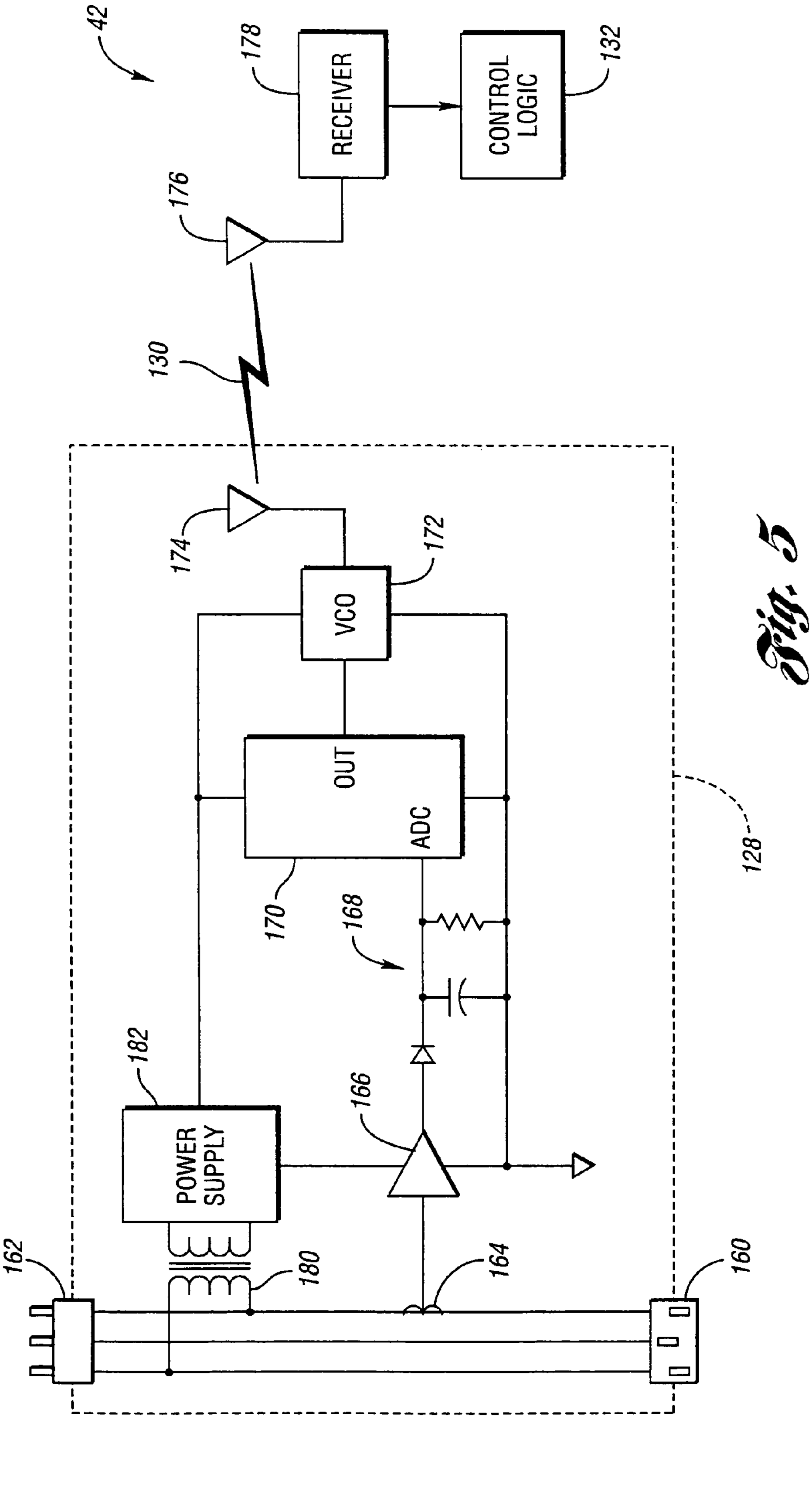
FIG. 5 is a block diagram illustrating a remote sensor according to an embodiment of the present invention.

Referring now to FIG. 5, the block diagram illustrating a remote sensor according to an embodiment of the present invention is shown. Remote sensor 128 is designed to measure current drawn by appliance 120. Remote sensor 128 includes AC receptacle 160 and AC plug 162 allowing remote sensor 128 to be inserted between a power cord for appliance 120 and a power outlet such as power cable 36 and outlet 38, respectively, illustrated in FIG. 1. Current sensor 164 senses current on a wire running between receptacle 160 and plug 162. Current senor 164 may be a low value resistor, current transformer, hall effect sensor, and the like. Buffer amplifier 166 amplifies the output of current sensor 164 for a peak detection circuit, shown generally by 168. The peak current level is sampled by an analog-to-digital converter in microcontroller 170.

Microcontroller 170 watches for significant changes in the peak level of sensed current. In the case of a garage door opener, a sharp increase in current corresponds with activating drive 28. By watching for a significant change in current draw, microcontroller 170 can ignore any low level current draw necessary to support electronics in garage door opener 26. When a change in current draw is detected, microcontroller 170 signals voltage controller oscillator 172 to transmit sensor signal 130 from antenna 174.

Programmable remote control 42 includes antenna 176 receiving radio frequency sensor signal 130. Receiver 178 detects radio frequency sensor signal 130 and signals control logic 132 that sensor 128 has detected a change in the activation state of appliance 120.

Sensor 128 may be battery powered. Alternatively transformer 180, inserted in line between receptacle 160 and plug 162, and power supply 182 provide regulated voltage for buffer amplifier 166, microcontroller 170 and voltage controlled oscillator 172.

Figure 6:
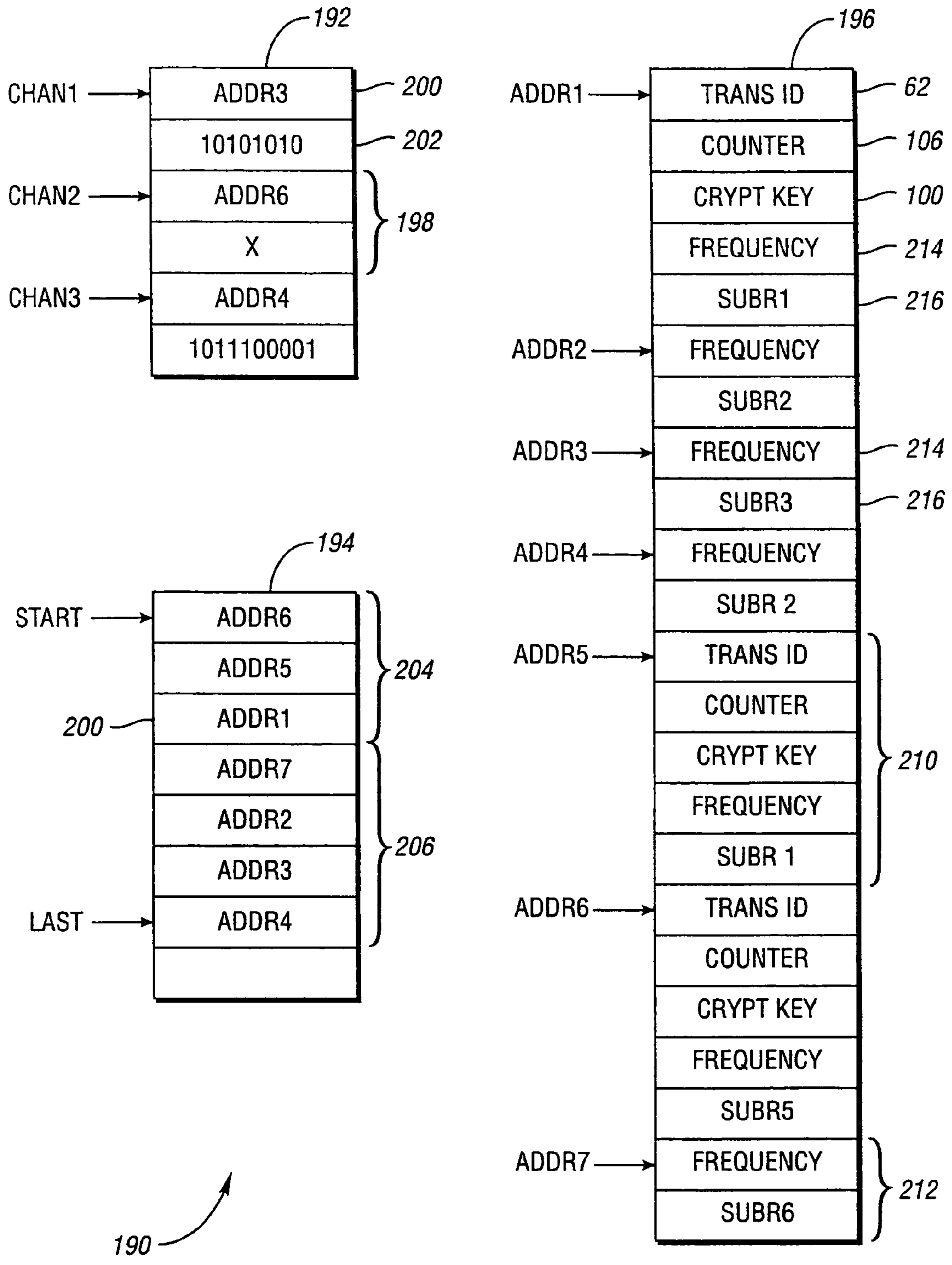
FIG. 6 is a memory map illustrating activation signal sequencing according to an embodiment of the present invention.

Referring now to FIG. 6, a memory map illustrating activation signal sequencing according to an embodiment of the present invention is shown. A memory map, shown generally by 190, represents the allocation of memory for data tables within programmable remote control 42. Preferably, this data is held in non-volatile memory such as flash memory 144. Memory map 190 includes channel table 192, search table 194 and scheme table 196.

Channel table 192 includes a channel entry, one of which is indicated by 198, for each channel supported by programmable remote control 42. Typically, each channel corresponds to a user input. In the example illustrated in FIG. 6, three channels are supported. Each channel entry 198 has two fields, scheme address 200 and fixed code 202. Scheme address 200 points to a field in scheme table 196 holding data describing characteristics of a particular activation scheme. Fixed code value 202 holds the programmed fixed code for a fixed code scheme. Fixed code value 202 may also hold function code 64 in fixed code modes. Fixed code value 202 may hold a function code 64 or may not be used at all in a channel programmed for a rolling scheme.

Search table 194 contains a sequence of scheme addresses 200 corresponding to the order of activation signals generated for sequence of activation signals 44. Addresses 200 may be arranged to generate a variety of sequences 44. For example, first sequence 204 may contain addresses 200 pointing to rolling code schemes and second sequence 206 may contain addresses 200 pointing to fixed code schemes. This will result in activation signals for all rolling code schemes being sent in sequence 44 prior to sending any activation signal for a fixed code scheme.

In another embodiment, at least some of addresses 200 are arranged based on popularity of activation schemes. In particular, activation schemes generating activation signals for appliances with greater market penetration are listed before schemes generating activation signals for less popular appliances. In this manner, the average latency before generating activation signal 34 for a given appliance is reduced.

Scheme table 196 holds characteristics and other information necessary for generating each activation signal in sequence of activation signals 44. Scheme table 196 includes a plurality of rolling code entries, one of which is indicated by 210, and a plurality of fixed code entries, one of which is indicated by 212. Each rolling code entry 210 includes transmitter identifier 62, counter 106, crypt key 100, carrier frequency 214, and subroutine address 226. Subroutine address 226 points to code executable by control logic 132 for generating an activation signal. Additional characteristics may be embedded within this code. Each fixed code entry 212 includes carrier frequency 214 and subroutine address 216.

Figure 7:
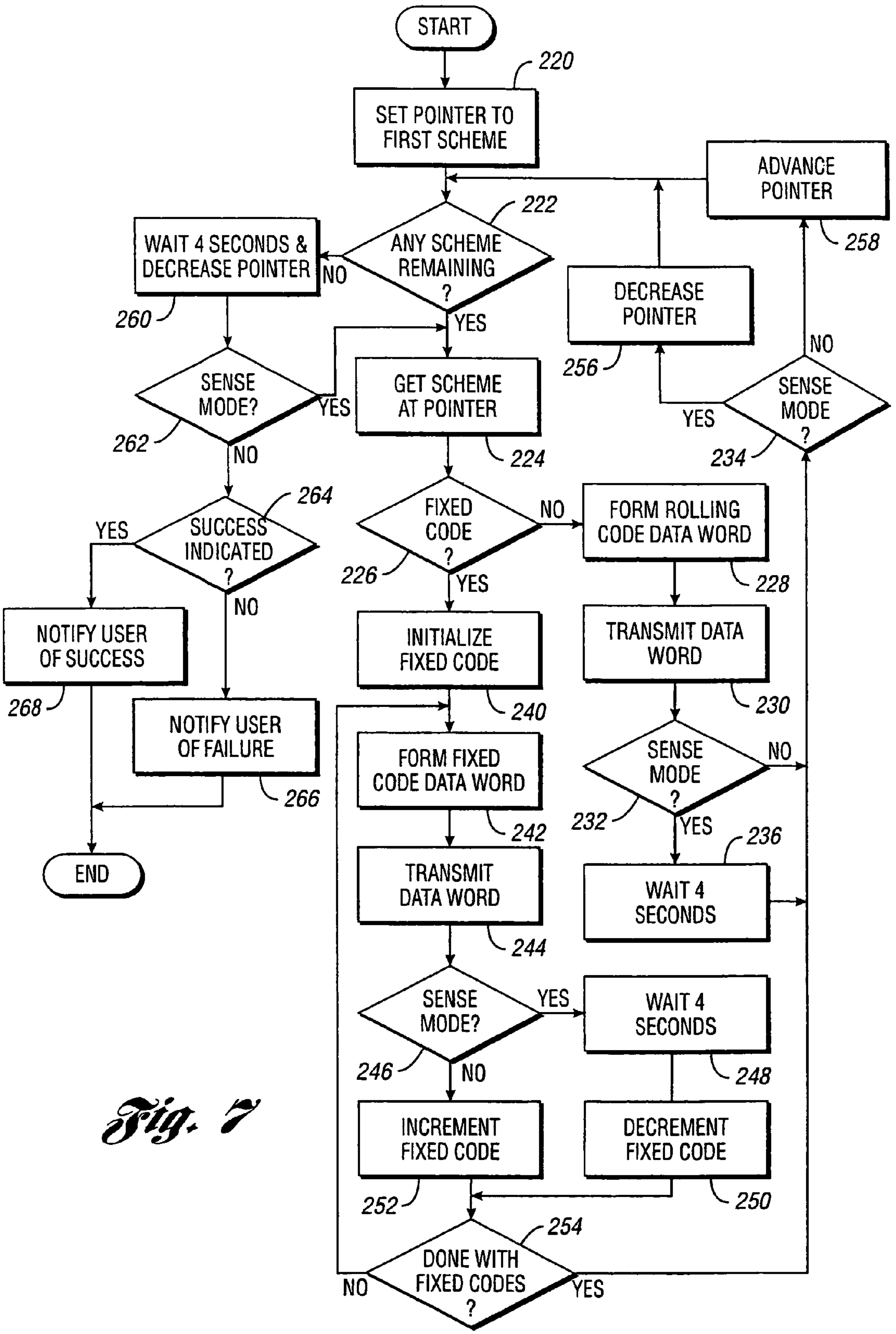
FIGS. 7, 8, and 9 are flow charts illustrating operation of an automatically programmable remote control according to an embodiment of the present invention.
Figure 8:
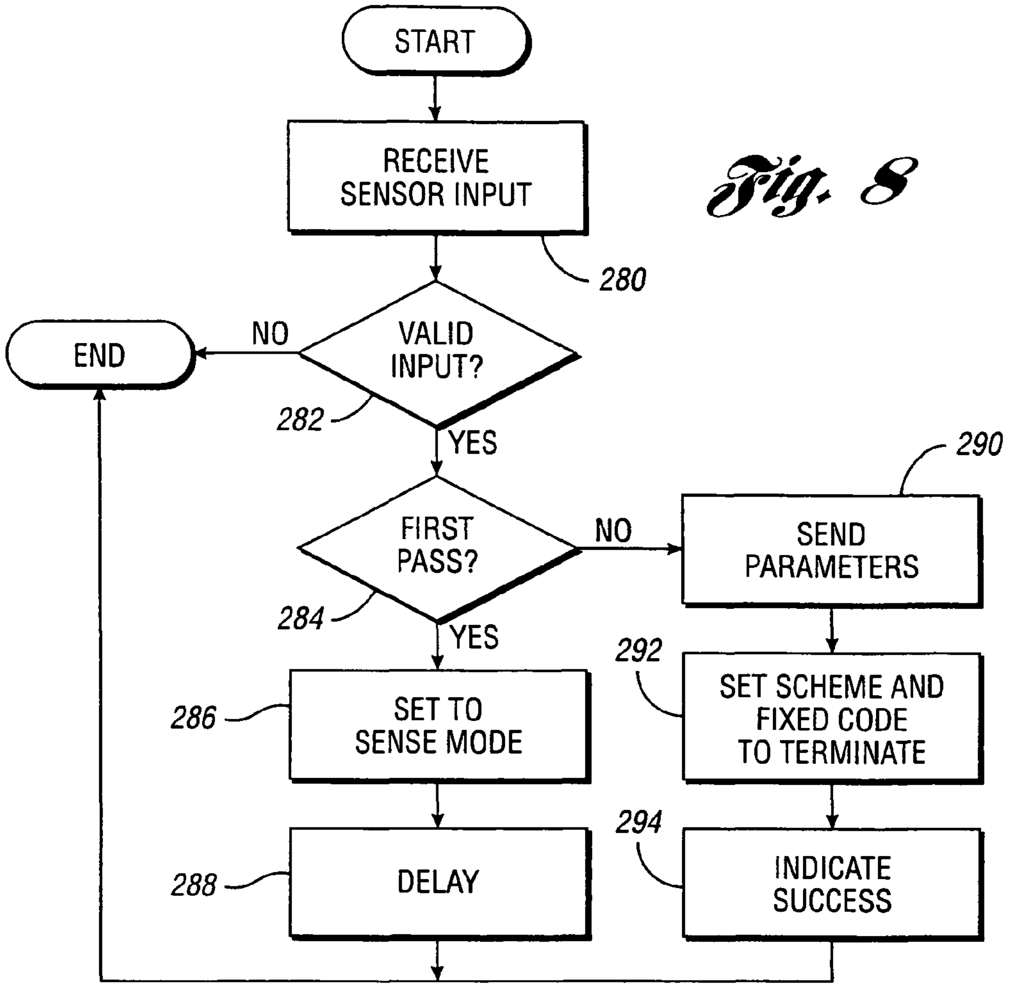
Figure 9:
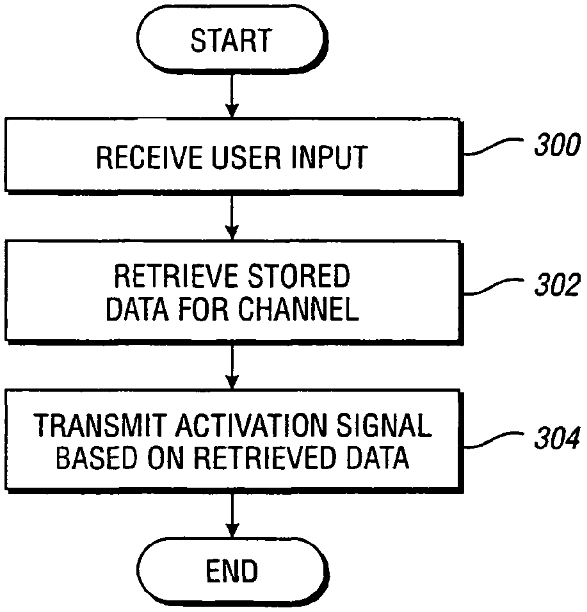

Referring now to FIGS. 7, 8, and 9, flow charts illustrating operation of an automatically programmable remote control according to an embodiment of the present invention are shown. As will be appreciated by one of ordinary skill in the art, the operations illustrated are not necessary sequential operations. Similarly, operations may be performed by software, hardware, or a combination of both. The present invention transcends any particular implementation and the aspects are shown in sequential flow chart form for ease of illustration.

FIG. 7 illustrates a learn mode background routing. For a simple system with pushbuttons for input, a particular channel may be placed in learn mode by depressing the channel pushbutton for an extended period of time. The basic scheme shown in FIG. 7 is to transmit each activation signal in sequence of activation signals 44 in rapid succession until sensor input indicates successful activation. Because there may be some lag between transmitting the successful activation signal and sensing appliance activation, the routine reverses the order of activation transmission. Enough delay is inserted between each activation signal transmitted a second time to detect another activation before the next transmission. This second pass through sequence of activation signals 44 is referred to as sense mode.

The amount of time required to transmit an entire sequence of activation signals 44 depends on the number and types of activation signals transmitted. As an example, consider a family of appliances which may be activated using one of 25 different schemes, ten of which are rolling code schemes and fifteen of which are fixed code schemes. Assume further that each fixed code scheme uses a ten bit fixed code, resulting in 15,360 different fixed code activation signals. For simplicity, each fixed code transmission may be considered a separate activation scheme. Further, assume that each activation signal requires 50 msec to transmit and a further 50 msec in between each scheme transmission. Using these assumptions, all possible schemes can be transmitted within 26 minutes.

If most appliances are activated by either one of a rolling code type or one of only a few fixed code types, the average time until transmission of a successful activation signal can be decreased by transmitting activation signals corresponding to these types first.

With specific reference now to FIG. 7, a pointer is set to the first scheme, as in block 220. A variable pointer is set to the first address 200 in search table 194 (START). A check is made to determine if any schemes remain, as in block 222. The pointer value is compared to the last address 200 in search table 194 (LAST). If any schemes remain, characteristics corresponding to the present scheme are retrieved, as in block 224. This may be accomplished by using the pointer address to extract characteristics from scheme table 196.

A check is made to determine if the present scheme is fixed, as in block 226. This may be accomplished based on the pointer value, based on information in scheme table 196, or the like. If not, a rolling code data word is formed, as in block 228. For example, crypt key 100 may be used to generate a rolling code value from counter 106. The rolling code value and transmitter identifier 162 are concatenated to form the data word. The data word is transmitted, as in block 230. A check is made to determine if the system is in sense mode, as in block 232. Sense mode is entered after receiving a sensor signal indicating the first successful appliance activation. If not in sense mode, flow continues at block 234. If in sense mode, a delay is introduced, as in block 236. This delay must be sufficient to allow the appliance to respond. In the example described, a delay of four seconds is used. Flow then continues with block 234.

Returning to now to block 226, if a fixed code activation signal is to be transmitted, the fixed code is initialized, as in block 240. A loop is then entered for transmitting an activation signal for each fixed code value or scheme. A fixed code data word is formed, as in block 242. The fixed code value and any other necessary information such as, for example, transmitter identifier or function code are concatenated to form the data word. The data word is transmitted, as in block 244. A check is made to determine if the system is operating in sense mode, as in block 246. If so, a delay is introduced, as in block 248, and the fixed code is decremented, as in block 250. If not, the fixed code is incremented, as in block 252. A check is made to determine if an activation signal for each fixed code has been generated, as in block 254. If not, the fixed code loop is repeated. If so, flow continues at block 234.

In block 234, a check is made to determine if the system is in sense mode. If so, the scheme pointer is decreased, as in block 256. If not, the scheme pointer is advanced, as in block 258. A check is again made to determine if any schemes remain, as in block 222.

Returning again to block 222, if no schemes remain, a delay is introduced and the pointer is decreased to point to the last scheme, as in block 260. A check is made to determine if the system is in sense mode, as in block 262. If so, characteristics of the next scheme are loaded and activation signals are transmitted in reverse order. If not, programming is completed. A check is made to determine if success was indicated, as in block 264. If not, the user is notified of failure, as in block 266. If successful, the user is so notified, as in block 268. User notification of failure or success may be accomplished by flashing different patterns in one or more indicator lamps.

The search technique illustrated in FIG. 7, namely rapidly searching up through a sequence then, after receiving a sensor signal, reversing the order and slowly searching down through the sequence, is one of many search techniques that can be used to identify the proper activation scheme. For example, a single slow search may be used. Another technique is to rapidly search up through the sequence then, after receiving a sensor signal, starting at some point within the sequence already transmitted and searching out in both directions. The point chosen may be based on knowledge about expected delays between transmitting the correct activation signal and receiving the resulting sensor signal.

Referring now to FIG. 8, a sensor routine for use in learn mode is illustrated. This routine may be implemented, for example, as an interrupt service routine triggered by receiving sensor signal 130. Sensor input is received, as in block 280. A check is made to determine if the input is valid, as in 282. This check may include comparison to a previous value, compensation for noise, switch debouncing, and the like. If the input is not valid, the routine is ended. If the input is valid, a check is made to determine if the current pass is the first pass through the routine, as in block 284. If so, the mode is set to sense mode, as in block 286. A delay may also be introduced, as in block 288. This delay allows the effect of appliance activation to settle out. For example, if the appliance is a garage door opener, the delay may be sufficient to permit the garage door to fully open or close.

Returning again to block 284, if the pass check indicates a second pass through the routine, parameters are stored, as in block 290. The current pointer value is stored as scheme address and, if a fixed code activation signal was sent, the fixed code is saved as fixed code 202 in the appropriate locations in channel table 192. The scheme and fix code are set to terminate, as in block 292. The pointer is set to the last value and, if necessary, the fixed code is set to the last possible fixed code value. This results in terminating the background loop illustrated in FIG. 7 upon return from the interrupt service routine. A flag indicating success is set, as in block 294.

Referring now to FIG. 9, operate mode is illustrated. User input is received, as in block 300. If pushbuttons are used, a short depression of a particular pushbutton indicates operate mode for the channel corresponding to the asserted pushbutton. Stored data for that channel is retrieved, as in block 302. This is accomplished by loading scheme address 200 and fixed code 202, if necessary, from the appropriate entry in channel table 192. The retrieved scheme address 200 is then used to load characteristics from scheme table 196. An activation signal is transmitted based on the retrieved data, as in block 304.

While embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for remotely activating a garage door opener, wherein the garage door opener activates to move a garage door between a closed position in which the garage door covers a garage opening and an opened position in which the garage door uncovers the garage opening upon receiving an activation signal based on one of a plurality of radio frequency (RF) fixed code and rolling code activation schemes, the method comprising:

providing a remote control and a sensor on a vehicle;

positioning the vehicle proximate to the garage opening;

transmitting energy from the vehicle toward the garage opening, whereby the energy is reflected by the garage door while the garage door is in the closed position and is unreflected while the garage door is in the opened position such that a change in the reflected energy is indicative of the garage door being moved between the closed and opened positions;

monitoring by the sensor the reflected energy;

transmitting from the remote control to the garage door opener a sequence of different activation signals, each activation signal in the sequence of activation signals based on a respective one of the plurality of RF fixed code and rolling code activation schemes;

transmitting from the sensor to the remote control a sensor signal indicating activation of the garage door opener in response to the sensor detecting a change in the reflected energy;

based on the sensor signal, determining by the remote control which of the plurality of RF fixed code and rolling code activation schemes resulted in the remote control transmitting an activation signal in the sequence of activation signals that activated the garage door opener; and associating data representing the determined activation scheme with an activation input of the remote control.

2. The method of claim 1 wherein:

transmitting from the remote control to the appliance the sequence of activation signals comprises transmitting the activation signals based on the RF rolling code activation schemes before transmitting the activation signals based on the RF fixed code activation schemes.

3. The method of claim 1 wherein:

transmitting from the remote control to the appliance the sequence of activation signals comprises transmitting, for each of the plurality of RF fixed code activation schemes, activation signals having different fixed code values.

4. The method of claim 1 wherein:

the sensor is remote from the remote control and the sensor signal is a RF sensor signal.

5. A system for remotely activating a garage door opener, wherein the garage door opener activates to move a garage door between a closed position in which the garage door covers a garage opening and an opened position in which the garage door uncovers the garage opening upon receiving an activation signal based on one of a plurality of radio frequency (RF) fixed code and rolling code activation schemes, the system comprising:

a vehicle having a remote control and a sensor;

wherein the vehicle transmits energy toward the garage opening, whereby the energy is reflected by the garage door while the garage door is in the closed position and is unreflected while the garage door is in the opened position such that a change in the reflected energy is indicative of the garage door being moved between the closed and opened positions;

the sensor operative to monitor the reflected energy and to transmit a sensor signal indicating activation of the garage door opener in response to detecting a change in the reflected energy; and the remote control having a transmitter, memory, and control logic, wherein the control logic is in communication with the sensor, the transmitter, and the memory;

wherein the control logic controls the transmitter to transmit to the garage door opener a sequence of different activation signals each based on a respective one of the plurality of RF fixed code and rolling code activation schemes;

wherein the control logic receives the sensor signal from the sensor and uses the sensor signal to determine which of the plurality of RF fixed code and rolling code activation schemes resulted in the transmitter transmitting an activation signal in the sequence of activation signals that activated the gargage door opener;

wherein the control logic stores data into the memory indicating the determined activation scheme.

6. The system of claim 5 wherein:

the remote control has a user activation input;

wherein the control logic controls the transmitter to transmit an activation signal based on the determined activation scheme stored in the memory upon an assertion of the user activation input.

7. The system of claim 5 wherein:

the control logic controls the transmitter to transmit the activation signals in the sequence of activation signals based on the RF rolling code activation schemes before transmitting the activation signals in the sequence of activation signals based on the RF fixed code activation schemes.

8. The system of claim 5 wherein:

the control logic controls the transmitter to transmit, for each of the plurality of RF fixed code activation schemes, activation signals having different fixed code values.

9. The system of claim 5 wherein:

the sensor transmits the sensor signal as a RF signal.

* * * * *